United States Patent
Krowl et al.

(10) Patent No.: US 6,840,994 B2
(45) Date of Patent: Jan. 11, 2005

(54) CALCIUM SILICATE INSULATING MATERIAL CONTAINING ALUMINA SILICA MICROSPHERES

(75) Inventors: Thomas R. Krowl, Littleton, CO (US); Bryan K. Doerr, Portersville, PA (US); Michael W. Borski, Dracut, MA (US)

(73) Assignee: BNZ Materials, Inc., Littleton, CO (US)

( * ) Notice: Subject to any disclaimer, the term of this patent is extended or adjusted under 35 U.S.C. 154(b) by 66 days.

(21) Appl. No.: 10/209,807

(22) Filed: Jul. 22, 2002

(65) Prior Publication Data

US 2003/0029360 A1 Feb. 13, 2003

Related U.S. Application Data

(63) Continuation-in-part of application No. 09/742,164, filed on Dec. 20, 2000, now abandoned.

(51) Int. Cl.$^7$ .................................................. C09C 1/02
(52) U.S. Cl. ....................... 106/470; 106/792; 106/793; 106/796; 252/62
(58) Field of Search ................................. 106/470, 792, 106/793, 796; 252/62

(56) References Cited

U.S. PATENT DOCUMENTS 4,303,450 A * 12/1981 Hacker
5,073,199 A * 12/1991 Krowl et al. ................ 106/797

* cited by examiner

Primary Examiner—Paul Marcantoni
(74) Attorney, Agent, or Firm—Quinn & Quinn, P.C.; William J. Quinn; Cornelius P. Quinn

(57) ABSTRACT

An asbestos free, calcium silicate insulating material suitable for use in the casting of molten non-ferrous metals, and suitable for use in applications where a fire resistant, heat insulating, electrical insulating, and corrosion resistant material is desirable. The calcium silicate insulating material is peoduced by combining lime, a siliceous component, alumina silica microspheres, wollastonite and organic fibrous material in the presence of water to form a slurry. The slurry is then placed under steam pressure, to react the lime, siliceous component and water, dried, and heat treated if necessary.

8 Claims, No Drawings

CALCIUM SILICATE INSULATING MATERIAL CONTAINING ALUMINA SILICA MICROSPHERES

CROSS REFERENCE TO RELATED APPLICATION

This application is a continuation-in-part and claims the benefit of U.S. patent application Ser. No. 09/742,164 filed Dec. 20, 2000, now abondoned, and entitled Calcium Silicate Insulating Material Containing Alumina Silica Microspheres.

FIELD OF THE INVENTION

The present invention relates generally to improved insulating heat-resistant materials containing alumina silica microspheres and methods of producing such materials. The present invention further relates to such materials containing alumina silica microspheres and methods wherein the resulting materials produced are suitable for use in the casting of non-ferrous metals such as aluminum and similar metals.

BACKGROUND OF THE INVENTION

A variety of insulating heat-resistant materials suitable for use in casting of non-ferrous metals are well known in the prior art. Of the insulating heat-resistant materials utilized in the process of casting non-ferrous metals that are known in the prior art, calcium silicate based materials have proven to be of particular utility because of their small heat capacities, high heat insulating capability and non-wetting properties in contact with molten non-ferrous metals.

Calcium silicate based insulating materials employed in casting of non-ferrous metals have typically been of the tobermorite-type matrix structure and xonotlite-type matrix structure of calcium silicate insulating material.

A fundamental tobermorite-type matrix structure of calcium silicate insulating material is disclosed in U.S. Pat. Nos. 4,111,712 and 4,128,434 to Pusch. This fundamental tobermorite type matrix structure of calcium silicate insulating material is produced by combining, a source of calcium, such as hydrated lime or quick lime, a source of siliceous material, such as silica, diatomaceous earth, silica fume, colloidal silica, or other suitable oxides of silicon, fibrous wollastonite and an organic fiber, such as kraft made from wood pulp, in the presence of at least one part by weight water per part by weight of the forgoing combined materials, to form an aqueous slurry. The aqueous slurry is then poured into a mold where the excess water is pressed out of the mixture to form an uncured shape, typically a sheet. The uncured shape is then placed in an autoclave where it is heated under steam pressure of about 100 psi. The shape is then oven dried to about 250 degrees Fahrenheit, and subsequently heat treated to above 500 degrees Fahrenheit. Finally, the resultant tobermorite type calcium silicate insulating material is cut or machined to the appropriate dimensions for use in the particular application.

As with the tobermorite-type matrix structure of calcium silicate insulating material, the xonotlite-type matrix structure of calcium silicate insulating material is known in the prior art. A fundamental xonotlite-type matrix structure of calcium silicate insulating material is produced by combining a source of calcium, such as hydrated lime or quick lime, a source of siliceous material, such as silica, diatomaceous earth, silica fume, colloidal silica, or other suitable oxides of silicon, fibrous wollastonite, an organic fiber, such as kraft made from wood pulp in the presence of at least one part by weight water per part by weight of the forgoing combined materials in an autoclave under about 200 psi steam pressure. The resultant aqueous slurry is then pressed in a mold and dried in an oven.

Alternatively, the fundamental xonotlite-type matrix structure of calcium silicate insulating material may be produced by mixing a source of calcium, such as hydrated lime or quick lime, a source of siliceous material, such as silica, diatomaceous earth, silica fume, colloidal silica, or other suitable oxides of silicon, fibrous wollastonite, an organic fiber, such as kraft made from wood pulp in the presence of at least one part by weight water per part by weight of the forgoing combined materials in the presence of water to form an aqueous slurry. The aqueous slurry is then poured into a mold where the excess water is pressed out of the slurry to form an uncured shape, typically a sheet. The uncured shape is then placed in an autoclave where it is heated under steam pressure of about 200 psi. The shape is then oven dried.

Finally, the resultant xonotlite type calcium silicate insulating material is cut or machined to the appropriate dimensions for use in the particular application.

Although these fundamental tobermorite type and xonotlite type calcium silicate insulating materials have been found to be suitable for use in connection with the casting of relatively low melting point non-ferrous metals and in other uses, certain shortcomings of these insulating materials have become apparent in application. In producing an optimal calcium silicate insulating material, it is desirable that the insulating material have reduced density, increased strength, improved thermal insulating properties, be homogeneous throughout with minimized thermal shrinkage. Of particular importance for calcium silicate insulating material utilized in connection with the casting of non-ferrous metals, such as aluminum, is the necessity that the material have sufficient physical strength. In casting non-ferrous metals, such as aluminum, the insulating material that comes in contact with the elevated temperature of the molten metal is particularly susceptible to cracking and fracture; therefore sufficient physical strength and thermal dimensional stability are required of the insulating material. Additionally, in connection with the casting of non-ferrous metals, it is desirable that outgassing of the insulating material in contact with the molten metal be minimized. Several variants and improvements of the tobermorite type and xonotlite type calcium silicate insulating materials are known in the prior art which attempt to rectify the shortcomings of the fundamental tobermorite type and xonotlite type calcium silicate insulating materials.

In the past, asbestos fibers had been utilized as a reinforcing fiber in manufacture of calcium silicate insulating materials to provide sufficient strength and toughness to the insulating material. Although such asbestos containing insulating materials performed well, the use of asbestos fibers has been widely discontinued due to health and environmental concerns.

U.S. Pat. No. 5,073,199 to Krowl et al. discloses a tobermorite type calcium silicate insulating material containing pitch based graphite fiber to provide toughness and strength to the insulating material. However, the incorporation of such graphite fiber and its associated material cost results in an appreciable increase in the cost of the resultant product.

U.S. Pat. No. 4,690,867 to Yamamoto et al. discloses a xonotlite type calcium silicate insulating material with improved strength suitable for non-ferrous metal casting wherein reinforcing carbon fibers are not uniformly distributed in the material thus having zones of varying strength. Use of the material disclosed in U.S. Pat. No. 4,690,867 for molten metal casting is often accompanied by undesirable outgassing which creates voids and contaminants in the resultant cast metal.

U.S. Pat. Nos. 4,773,470 and 4,897,294 to Libby, et al. disclose the use of delaminated vermiculite as a substitute for asbestos in the composition of a tobermorite insulating material suitable for use in molten metal casting. Although the use of vermiculite as a substitute for asbestos results in material with reduced thermal shrinkage in comparison to materials containing only wollastonite as the inorganic fiber, the machineability of the material is compromised.

As a final example of attempts of the prior art to rectify the shortcomings of the fundamental tobermorite type and xonotlite type calcium silicate insulating materials, U.S. Pat. No. 4,144,121 to Otouma, et al. and U.S. Pat. No. 4,334,931 to Assumi, et al. disclose the use of previously synthesized xonotlite crystalline material to provide strength comparable to that of an asbestos containing board. However, manufacture of these calcium silicate insulating materials is more costly, in that, an additional step is required to produce the xonotlite crystalline material that is incorporated with the starting materials.

Accordingly, it is the principle objective of the present invention to provide an insulating material that is suitable for use in non-ferrous molten metal casting that is lightweight with greater refractoriness, is tough and resistant to high temperature cracking, and does not possess the shortcomings of the prior art insulating materials.

An additional objective of the present invention is to provide an asbestos-free fire resistant, heat insulating, electrical insulating, and corrosion resistant material, that may be utilized in other applications in addition to non-ferrous metal casting, having reduced health exposure risk and minimal environmental impact.

Other objects and advantages of the present invention will be apparent to those skilled in the art from the following description of the invention.

SUMMARY OF THE INVENTION

The present invention is an asbestos-free thermal insulating material that is resistant to high temperature cracking that is formed from a mixture consisting essentially of, in parts by weight percentage: 12 to 40 weight percent of lime, 12 to 40 weight percent of a siliceous component, 0 to 70 weight percent of wollastonite, 10 to 70 weight percent of alumina silica microspheres, and 0 to 10 weight percent of organic fiber, in the presence of at least one part by weight water per part by weight of the combined materials of the mixture other than water, to form an aqueous slurry; molding the aqueous slurry into a shape and expelling excess water; curing the molded shape under appropriate steam pressure for sufficient time to cause the lime siliceous component and water to react to form the desired tobermorite or xonotlite hydrated calcium silicate matrix reinforced by the alumina silica microspheres and wollastonite, if present; thereafter, the cured shape is dried, heat treated and machined to particular shape, if desired.

Should a pre-mold reacted process be employed to form xonotlite, the slurry formed in the forgoing mixture, is reacted under appropriate steam pressure for sufficient time to cause the lime, siliceous component and water to react to form the desired xonotlite hydrated calcium silicate matrix; the slurry is then molded into a shape expelling excess water.

Thereafter, the molded shape is dried and machined to particular shape, if desired.

DETAILED DESCRIPTION OF THE INVENTION AND PREFERRED EMBODIMENTS

The principal components of the present invention are a calcium source, a siliceous component, alumina silica microspheres, wollastonite, if desired, and a small amount of organic fiber, if desired.

The calcium source may be any suitable hydrated lime or quick lime. The amount of lime utilized by weight is from 12 to 40 percent, and preferably from 14 to 20 percent, of the total weight of the components other than water.

The siliceous component utilized may be of any substantially pure sources of silica such as silica, diatomaceous earth, silica fume, colloidal silica, or other suitable oxides of silicon. The amount of siliceous component utilized by weight is from 12 to 40 percent, and preferably from 14 to 20 percent, of the total weight of the components other than water. The lime and siliceous component are utilized in a ratio suitable for the desired formation of the tobermorite or xonotlite hydrated calcium silicate matrix that forms through the reaction of the lime, siliceous component and water under appropriate conditions.

The alumina silica microspheres are lightweight hollow spherical particles, extracted from pulverized fuel ash generated by coal fired furnaces, such as those utilized in coal fired power stations, and are composed primarily of silica and alumina as their major components with some iron oxides as a minor component. The melting point of the alumina silica microspheres is above 2100 degrees Fahrenheit. As the alumina silica microspheres possess such a high melting point, they are particularly suitable for use in the calcium silicate based insulating material of the present invention and its applications including non-ferrous metal casting. Additionally, as the microspheres are hollow, the density of the resultant insulating material of the present invention is reduced and its refractoriness is increased. Further, as the shells of the microspheres are remarkably strong, they are able to easily withstand the rigorous mixing, pressing and treatment involved in the process of manufacturing the reacted calcium silicate insulating material of the present invention.

Suitable microspheres for use in the present invention are available, from the PQ Corporation under the trademark EXTENDOSPHERES and from Trelleborg Fillite, Inc. under the trademark FILLITE, with various grades and sizes. The present invention is not critically sensitive to the alumina and silica content of the various grades of microspheres; the alumina content of the various currently available grades of microspheres range from 27 to more than 43 weight percent, and the silica content ranges from 55 to 65 weight percent of the microspheres total weight. The size of the microspheres is also not critical to the present invention; microspheres are currently available in the range of about 5 to about 500 microns in size, all of which are suitable. A particularly suitable microsphere, because of its relatively low cost, is EXTENDOSPHERES SG which is composed of 58 to 65 weight percent silica, 28 to 33 weight percent alumina, and up to 4 weight percent iron oxides, with a mean particle diameter of 120 to 130 microns. The amount of silica alumina microspheres utilized by weight is between 10 and 70 percent, and preferably from 10 to 30 percent, of the total weight of the components other than water.

Wollastonite is a crystalline form of anhydrous calcium silicate. In the present invention, the wollastonite, if used, preferably has a particle size whereby 60 weight percent of its particles pass through a sieve no. 50 mesh screen. The wollastonite, if used, is up to 70 percent, and preferably from 30 to 50 percent, of the total weight of the components other than water.

An organic fiber may be incorporated to facilitate the handling and molding of the insulating material of the present invention and to provide green strength in the process of manufacture. The amount of organic fiber utilized is up to 10 percent, and preferably from 4 to 8 percent, of the total weight of the components other than water. The organic fiber may be wood fiber, polyester or other synthetic fiber, cotton or other natural fibers. Kraft, which is made from wood pulp is particularly preferred.

To form a calcium silicate insulating material of the present invention containing a predominantly and substantially pure tobermorite type hydrated calcium silicate matrix, the lime, the siliceous material, the alumina silica microspheres, the wollastonite, if utilized, and the organic fiber, if utilized, are mixed in the presence of at least one part by weight water per part by weight of the lime, siliceous material, alumina silica microspheres, wollastonite and organic fiber of the mixture to form an aqueous slurry. Mixing occurs with such vigor and for such time as is necessary to thoroughly disperse the dry solid materials throughout the slurry. The aqueous slurry is then placed into a mold where excess water is pressed from the aqueous slurry to form a shape retaining molded body. A typical shape of the molded body is a flat 4 foot by 8 foot sheet about ½ to 4 inches thick. The molded body is then cured under high pressure steam for such time and at such pressure as necessary cause the lime, siliceous material and water to react to form the tobermorite calcium silicate hydrate crystalline matrix. Steam pressure of about 100 psi for a period of about 24 to 32 hours has been employed to form a satisfactory tobermorite crystalline matrix; however other variations of time and steam pressure which are known in the art may be employed.

The cured body may then be oven dried to about 250 degrees Fahrenheit to reduce its moisture content and subsequently heat treated to burn away any organic fiber material that was utilized to facilitate handling and molding and provide green strength for the manufacturing process.

To form a calcium silicate insulating material of the present invention containing a predominantly and substantially pure xonotlite type hydrated calcium silicate matrix, the above components are used and the above steps for forming the insulating material having a tobermorite type hydrated calcium silicate matrix are followed with the exception that the heat treatment step is eliminated and the molded body is cured under high pressure steam for such time and at such pressure as necessary to cause the lime, siliceous material and water to react to form the xonotlite calcium silicate hydrate crystalline matrix. Steam pressure of about 200 psi for a period of about 15 to 20 hours has been employed to form a satisfactory xonotlite crystalline matrix; however other variations of time and steam pressure which are known in the art may be employed.

Additionally, a calcium silicate insulating material of the present invention containing a predominantly and substantially pure xonotlite type hydrated calcium silicate matrix may be manufactured by an alternate method. In this alternate method, the lime, the siliceous material, the alumina silica microspheres, the wollastonite, if utilized, and the organic fiber, if utilized, are mixed in the presence of at least one part by weight water per part by weight of the lime, siliceous material, alumina silica microspheres, wollastonite and organic fiber to form a slurry, which is placed under high pressure steam for such time and at such pressure as necessary to cause the lime, siliceous material and water to react to form xonotlite. Thereafter, the reacted aqueous slurry is placed into a mold where excess water is pressed from the aqueous slurry to form a molded body. The molded body may then be oven dried.

Some of the beneficial properties of the insulating material of the present invention are illustrated by way of the following non-limiting comparative examples. In each of the following examples, insulating materials of particular component formulations cured to a tobermorite type hydrated calcium silicate crystalline matrix were prepared as follows:

The components were mixed in the presence of water, which was utilized in an amount greater than one part by weight of water per part by weight of the components other than water, to form an aqueous slurry.

The aqueous slurry was then transferred into a mold and pressed to 700 psi, where the excess water was pressed from the aqueous slurry to form a green state flat sheet with the dimensions of 3 inches by 8 inches in comparative example 1, and 4 feet by 8 feet sheet in comparative examples 2 and 3. To ensure validity of comparison, test samples within each comparative example were pressed within the same mold and press.

The molded sheet was then cured under steam pressure of 100 psi for 24 hours causing the lime, siliceous material and water to react to form the tobermorite calcium silicate hydrate crystalline matrix.

The cured sheet was then oven dried to 250 degrees Fahrenheit until it reached an equilibrium moisture constant.

Finally the sheet was heat treated to above 500 degrees Fahrenheit, thereby burning away the organic fiber, until the mass of the sheet reached equilibrium.

Comparative Example 1

The following table sets forth the formulation variables in content of wollastonite and alumina silica microspheres of seven test samples and their measured density, modulus of rupture (bending strength) and calculated strength factor. The test samples were prepared with a formulation expressed in weight percent of the total components, other than water, of 17 percent hydrated lime, 17 percent silica flour, 6 percent kraft and the remainder as alumina silica microspheres and wollastonite, with the microsphere content increasing in 10 percent increments, as indicated in the table.

An important performance criterion for calcium silicate insulating material utilized in the casting of non-ferrous metals is its modulus of rupture (bending strength). Consistently, a higher density material will yield a higher modulus of rupture. To properly evaluate the strength characteristics of materials with different densities, a formula is employed to normalize the impact of variation in density; a strength factor, which normalizes this variation and allows comparisons to be made, is equal to the modulus of rupture (bending strength) divided by the density squared.

COMPARATIVE EXAMPLE 1 TABLE

| test sample number | 1 | 2 | 3 | 4 | 5 | 6 | 7 |
|---|---|---|---|---|---|---|---|
| microspheres (in weight percent) | 0 | 10 | 20 | 30 | 40 | 50 | 60 |

-continued

COMPARATIVE EXAMPLE 1 TABLE

| wollastonite (in weight percent) | 60 | 50 | 40 | 30 | 20 | 10 | 0 |
|---|---|---|---|---|---|---|---|
| density (in lbs/ft$^3$) | 65.0 | 52.1 | 47.6 | 44.1 | 42.5 | 38.1 | 36.8 |
| modulus of rupture (bending strength in psi) | 1400 | 1067 | 1155 | 794 | 856 | 639 | 468 |
| strength factor (MOR/D$^2$) | .33 | .39 | .51 | .41 | .47 | .44 | .35 |

From the table in this comparative example, it can be observed from test sample 1, which contains no microspheres, and test sample 3, which substitutes 20 percent weight of microspheres for a corresponding amount of wollastonite, that the strength factor, which is normalized for variations in density, can be increased by the substitution of microspheres for wollastonite, while at the same time overall density is reduced. In comparison of test sample 1, containing no microspheres and test sample 2 which substitutes only 10 percent weight of microspheres for a corresponding amount of wollastonite, an appreciable increase in the strength factor is observed with only a 10 percent by weight substitution of microspheres for wollastonite. Further, it becomes apparent from the test sample results, and in particular the results of test sample 7, in which all of the wollastonite has been replaced by microspheres, that the microspheres in the present invention are bound to or are being tightly incorporated with the calcium silicate matrix. Typically, when density is reduced by incorporation of low density insulating materials, such as perlite and vermiculite, the strength of the material is reduced dramatically.

Comparative Example 2

In this comparative example, a calcium silicate material test sample of the prior art, not containing alumina silica microspheres, was compared to a similar test sample formulation of the present invention containing alumina silica microspheres. Both test samples were prepared with a formulation expressed in weight percent of the total components, other than water, of 17 percent hydrated lime, 17 percent silica flour, and 6 percent kraft. In the test sample of the prior art material, the remaining 60 percent component was composed of wollastonite; and in the test sample formulation of the present invention the remaining portion was composed of 20 percent alumina silica microspheres and 40 percent wollastonite.

Three specimens from both samples were cut to dimensions of 1 inch by 1 inch by 12 inches. The specimens were then conditioned at 250 degrees Fahrenheit for 24 hours to normalize the specimens and remove any moisture they may have accumulated. One specimen at a time was submerged in a liquid aluminum bath of a known alloy at a temperature of 1350 degrees Fahrenheit so that the wetted end of the specimen was three inches below the surface of the aluminum. The outgassing from the specimen was observed as bubbles from the liquid aluminum. The duration that the bubbles were observed, from the time of contact with the liquid aluminum to the cessation of the bubbles was recorded along with the size of the bubbles observed.

Calcium silicate insulating materials, even when heat treated, exhibit some amount of out gassing when exposed to liquid non-ferrous metals. This outgassing, or bubbling in the molten metal, is caused by the expansion of the air that exists in the calcium silicate insulating material as it is taken from room temperature and exposed to molten metal. Minimization of outgassing is desirable to prevent contamination of the cast metal and prevent injury from molten metal. The amount of outgassing from a calcium silicate insulating material can be evaluated by observing the duration and size of bubbles exhibited when the calcium silicate insulating material is immersed in molten metal, wherein it is preferable to observe smaller bubbles and shorter duration.

The specimens from the test sample of the prior art were observed to exhibit outgassing effects of about 3 minutes duration with medium sized bubbles, whereas the specimens of a formulation of the present invention were observed to exhibit outgassing effects for only about 2 minutes duration with medium sized bubbles.

Comparative Example 3

In this comparative example, a calcium silicate material test sample of the prior art, not containing alumina silica microspheres, was compared to a similar test sample formulation of the present invention containing alumina silica microspheres. Both test samples were prepared with a formulation expressed in weight percent of the total components, other than water, of 17 percent hydrated lime, 17 percent silica flour, and 6 percent kraft. In the test sample of the prior art material, the remaining 60 percent component was composed of wollastonite; and in the test sample formulation of the present invention the remaining portion was composed of 20 percent alumina silica microspheres and 40 percent wollastonite.

The 4 foot by 8 foot sheet test samples were then cut into 32 1 foot by 1 foot square specimens. The specimens were each weighed and measured in length, width, and thickness to calculate the density in pounds per cubic foot of each specimen. Thereafter the maximum variation within each test sample was calculated.

It is desirable that calcium silicate insulating materials be uniform and consistent throughout. Consistency and uniformity of the insulating material increases its thermal shock resistance, resulting in greater crack resistance when placed in contact with molten metal. Additionally, consistency and uniformity of the insulating material facilitates machining, and ensures consistent density of parts machined from a sheet of insulating material, irrespective of the origin location of the pre-machined blank within the sheet of the insulating material.

The maximum and minimum density measured from specimens of the prior art test sample were 78.5 lbs/ft$^3$ and 62.0 lbs/ft$^3$ respectively. The prior art test sample therefore exhibited a measured variation in density within the 4 foot by 8 foot sheet of 16.5 lbs/ft$^3$. In comparison the maximum and minimum density measured from the specimens of the present invention test sample were 52.3 lbs/ft$^3$ and 48.0 lbs/ft$^3$ The present invention test sample therefore exhibited a measured variation in density within the 4 foot by 8 foot sheet of only 4.3 lbs/ft$^3$, a dramatic increase in uniformity and consistency.

What is claimed is:

1. A calcium silicate insulating material formed from a mixture comprising: 12 to 40 weight percent lime, 12 to 40 weight percent of siliceous component and 10 to 70 weight percent alumina silica microspheres, all slurried in at least one part by weight water per part by weight of said mixture.

2. A calcium silicate insulation material as in claim 1, wherein said mixture further comprises up to 10 weight percent organic fiber.

3. A calcium silicate insulation material as in claim 1, wherein said mixture further comprises up to 60 weight percent wollastonite.

4. A calcium silicate insulation material as in claim 2, wherein said mixture further comprises up to 60 weight percent wollastonite.

5. A calcium silicate insulating material as in claim 2, wherein the amount of said lime of said mixture is 14 to 20 weight percent, the amount of said siliceous component of said mixture is 14 to 20 weight percent, the amount of said alumina silica microspheres of said mixture is 52 to 68 weight percent, and the amount of said organic fiber is 4 to 8 weight percent.

6. A calcium silicate insulating material as in claim 4, wherein the amount of said lime of said mixture is 14 to 20 weight percent, the amount of said siliceous component of said mixture is 14 to 20 weight percent, the amount of said alumina silica microspheres of said mixture is 10 to 30 weight percent, the amount of said wollastonite is 30 to 50 weight percent and the amount of said organic fiber is 4 to 8 weight percent.

7. An insulating material as in claims 1 through 6, wherein said lime and said siliceous component have reacted to form a predominantly tobermorite phase calcium silicate hydrate matrix.

8. An insulating material as in claims 1 through 6, wherein said lime and said siliceous component have reacted to form a predominantly xonotlite phase calcium silicate hydrate matrix.

* * * * *